Aug. 18, 1964     A. T. WUPPERMANN     3,144,702
METHOD OF MANUFACTURING CRANKSHAFTS FROM SEPARATE
COMPONENTS BY FLASH BUTT WELDING
Filed Sept. 25, 1961

Inventor:
August Theodor Wuppermann

United States Patent Office 3,144,702
Patented Aug. 18, 1964

3,144,702
METHOD OF MANUFACTURING CRANKSHAFTS FROM SEPARATE COMPONENTS BY FLASH BUTT WELDING
August Theodor Wuppermann, Leverkusen-Schlebusch, Germany, assignor to Theodor Wuppermann Gesellschaft mit beschränkter Haftung, Leverkusen, Germany
Filed Sept. 25, 1961, Ser. No. 140,569
Claims priority, application Germany Oct. 15, 1960
9 Claims. (Cl. 29—6)

Various methods of manufacturing crankshafts from separate components are already known. The separate components may consist, e.g., of a crank web, to which crank pins or journals are attached on both sides. The separate components may be connected in various ways to form the crankshaft. For instance, the crank pin portions may be screwed together. In this case they may be provided with interengaging teeth to prevent relative rotation, or a sleeve having internal teeth may be fitted over the pin portions, the internal teeth preventing also a relative rotation of the crankpins. In other known methods of manufacturing crankshafts, the separate components do not consist of crank webs provided with pin portions, but the shaft is assembled by fitting or clamping through pins to the crank webs. In order to enable the re-use of crankshafts after a pin breakage, the crank pin portions of the broken pin have been faced and connected by a common bushing. In methods of manufacturing crankshafts, it is also known to connect the separate components by flash butt welding.

The constant efforts of engine designers to increase the specific power output, particularly by supercharging, involve an increase in the stresses set up in the propulsion mechanism. Particularly in high-speed engines, this leads to the requirement that the bearing contact surfaces of the journals should consist of wear-resisting materials whereas the engine crankshaft as a whole should be highly elastic. What has been said of the crankshaft, applies analogously to shafts provided with crank discs, cams or camwheels or the like.

A plurality of methods have already been disclosed to provide the journals of the shaft with a wear-resisting surface. For this purpose, the bearing contact surfaces may be, e.g., surface-hardened, provided with electro-deposited hard metal layers, spray-coated or subjected to other surface-finishing treatments.

Surface hardening, however, involves unfavorable stress relations so that the creep strength of the shaft is much reduced. Surface hardening by nitriding involves disadvantages due to the small thickness of the hardened layer.

More particularly, the small thickness of the wear-resisting layer, which is in general only a few hundredths of a millimeter, renders a subsequent machining of the bearing surfaces difficult or impossible. Such machining, however, is indispensable for adjustment. Besides, machining is no longer possible after a certain period of operation. Finally, recent scientific investigations of the processes involved in hardening have lead to recognitions which indicate that the application of this process to the surface treatment of shafts to be subjected to high stresses is not generally recommendable.

The above remarks regarding nitriding apply also to hard chromium-plating.

The spray-coating of hard metal layers has not yet been developed to such a stage and reliability as to ensure the necessary absence of pores and the bond required between the base material and the coating.

For this reason, the known methods are not satisfactory and it is an object of the present invention to eliminate these disadvantages and provide a method which constitutes a basic improvement of the conditions outlined hereinbefore.

To accomplish this object, a method of manufacturing crankshafts from separate components consisting of a crank web and of crank pins disposed on both sides of the crank web, by flash butt welding, is characterized according to the invention in that covering bodies of wear-resisting material are applied to the individual crank pins before the separate components are assembled to form the crankshaft, the outer boundary surfaces of these covering bodies being used to form the bearing contact surfaces. Thus, the covering body may have any thickness which is tolerable economically. The material of the covering body may be selected independently of the properties of the base material and only in consideration of the requirements which are mainly related to the wear of the journals. For this reason, the material for the covering bodies may consist of a self-hardening steel or any other wear-resisting material which is harder than the base material but has the toughness required to resist the stresses that occur during manufacturing and operation.

The covering bodies will generally be applied to pin-shaped extensions of shaft components, such as crank discs, cams or camwheels. Other forms of connection, however, are not excluded. The firm connection is ensured in the simplest case by shrinking the covering body, which may consist of a covering tube, on the supporting portions of the shaft.

The components of the shaft may be assembled to form the shaft by methods known per se and in general use, particularly in connection with built-up crankshafts. Welding, particularly flash butt welding, has proved particularly suitable. Depending on the shape of the shaft and the expected stresses, the weld may be disposed in various positions. This will control the design and arrangement of the covering bodies. When the various components have been assembled to form the shaft, they are finished by machining as usual. Between the various machining operations, heat treatments are performed as are required in view of the nature of the material which is employed.

Shafts manufactured by a method suggested according to the invention are characterized by the arrangement of covering bodies of wear-resisting material on shaft portions which form bearing contact surfaces. The covering bodies may have boundary surfaces, the generatrix of which includes an angle with the longitudinal center line of the shaft or of a pin. This will result in tapered covering bodies, which have certain advantages over cylindrical covering bodies.

The drawing shows illustrative embodiments of the invention.

Figure 1:
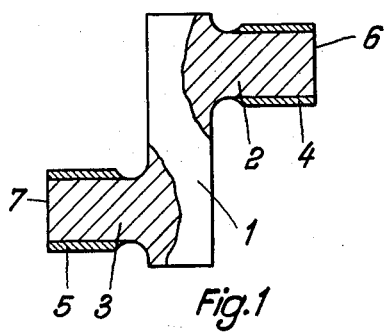
FIG. 1 is a vertical longitudinal sectional view showing a separate component of a crankshaft, which component consists of the crank web and two pin-shaped extensions thereof and is prepared for welding.
Figure 2:
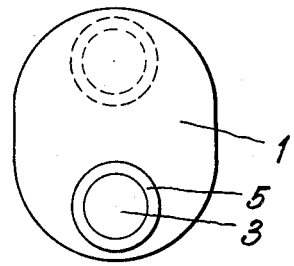
FIG. 2 is a side view showing the separate component illustrated in FIG. 1.

The shaft components shown in FIGS. 1 and 2 consists of the crank web 1 and two pin-shaped extensions 2, 3. Such a crankshaft component is preferably made by drop forging, followed by preliminary machining to an oversize on all sides. The pin-shaped extensions 2, 3 have been subjected to preliminary machining to such an extent that the prefabricated covering tubes 4, 5 consisting of wear-resisting material, such as self-hardening steel, can be applied by shrinking. The component is then faced to ensure that the end faces 6, 7 of the attached pin-shaped extensions are exactly flush with the outer end faces of the covering tubes.

Figure 3:
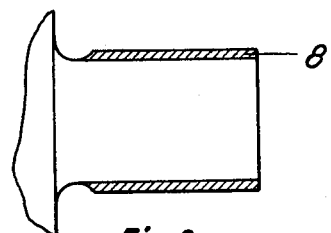
FIG. 3 is a longitudinal sectional view showing a pin-shaped extension having applied thereto a cylindrical, tubular covering body.
Figure 4:
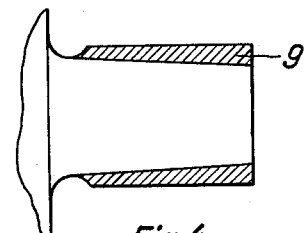
FIG. 4 is a sectional view similar to FIG. 3 and showing a structure comprising a covering tube having an inside boundary surface, the generatrix of which includes an angle with the longitudinal center line of the pin-shaped extension of the crank web.

FIG. 3 shows that the covering tubes 8 may be cylindrical whereas they are tapered according to FIG. 4, where the generatrix of the inside boundary surface of the tube is at an angle to the longitudinal center line of the pin-shaped extensions. This has the advantage that the transition to the crank web 1 is not substantially weakened and the inevitable enlargement at the butt-welded joint can be compensated in thickness.

Figure 5:
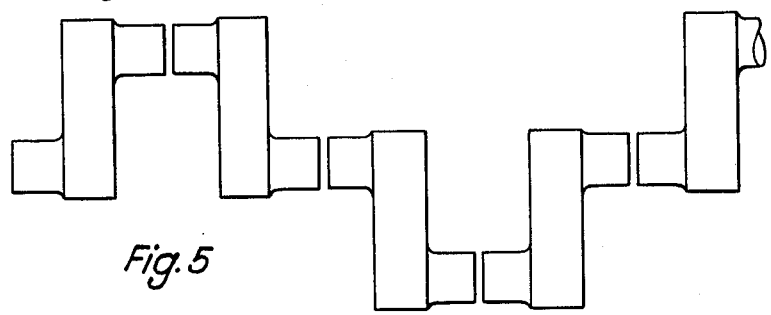
FIG. 5 shows a built-up crankshaft section, in which the welds are exactly in the middle of the pin-shaped extension of the crank webs.
Figure 6:
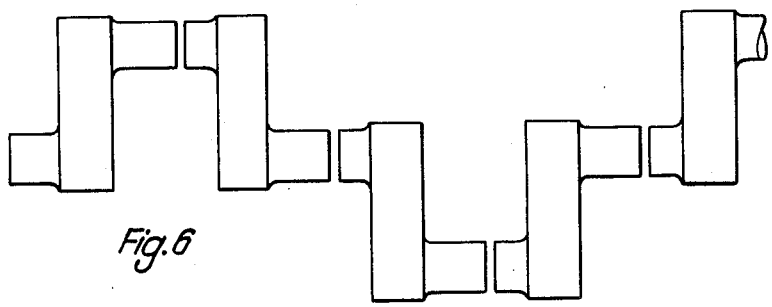
FIG. 6 is a view similar to FIG. 5 and shows welds offset from the middle.

The components of the shaft are joined as is shown in FIGS. 5 and 6. In the design of FIG. 5, the welds are disposed in the middle of the pin-shaped extensions, whereas FIG. 6 shows welds offset from the middle. This has the advantage that the weld is not disposed at the most highly stressed cross-section of a journal.

When the components shown in FIGS. 5 and 6 are provided with covering tubes according to FIGS. 3 and 4, the components are assembled, e.g., by butt welding, to form a shaft. The latter is then subjected to final machining in conjunction with a heat treatment selected in dependence of the base material and the material of the covering tubes.

What is claimed is:

1. A method of manufacturing crankshafts comprising the steps of manufacturing a plurality of separate components each comprising a crank web and crank pin portions projecting from said crank web integral therewith and each pin portion having a free end face; tightly fitting tubular bodies of wear-resistant material on said crank pin portions, respectively; and welding together said separate components at said end faces of corresponding ones of their crank pin portions to form a crankshaft having bearing contact surfaces formed by said wear-resistant material.

2. A method of manufacturing crankshafts comprising the steps of manufacturing a plurality of separate components each comprising a crank web and crank pin portions projecting from said crank web integral therewith and each pin portion having a free end face; shrink fitting tubular bodies of wear-resistant material on said crank pin portions, respectively; and welding together said separate components at said end faces of corresponding ones of their crank pin portions to form a crankshaft having bearing contact surfaces formed by said wear-resistant material.

3. A method of manufacturing crankshafts comprising the steps of manufacturing a plurality of separate components each comprising a crank web and crank pin portions projecting from said crank web integral therewith and each pin portion having a free end face; tightly fitting tubular bodies of wear-resistant material on said crank pin portions, respectively; and flash butt welding together said separate components at said end faces of corresponding ones of their crank pin portions to form a crankshaft having bearing contact surfaces formed by said wear-resistant material.

4. A method of manufacturing crankshafts comprising the steps of manufacturing a plurality of separate components each comprising a crank web and crank pin portions projecting from said crank web integral therewith and each pin portion having a free end face; tightly fitting tubular bodies of wear-resistant self-hardening material on said crank pin portions, respectively; and welding together said separate components at said end faces of corresponding ones of their crank pin portions to form a crankshaft having bearing contact surfaces formed by said wear-resistant material.

5. A method of manufacturing crankshafts comprising the steps of manufacturing a plurality of separate components each comprising a crank web and crank pin portions projecting from said crank web integral therewith and each pin portion having a free end face; shrink fitting tubular bodies of wear-resistant self-hardening steel material on said crank pin portions, respectively; and welding together said separate components at said end faces of corresponding ones of their crank pin portions to form a crankshaft having bearing contact surfaces formed by said wear-resistant material.

6. A method of manufacturing crankshafts comprising the steps of manufacturing a plurality of separate components each comprising a crank web and crank pin portions projecting from said crank web integral therewith and each pin portion having a cylindrical surface and a free end face; tightly fitting tubular bodies of wear-resistant material on said cylindrical surface of said crank pin portions, respectively; and welding together separate components at said end faces of corresponding ones of their crank pin portions to form a crankshaft having bearing contact surfaces formed by said wear-resistant material.

7. A method of manufacturing crankshafts comprising the steps of manufacturing a plurality of separate components each comprising a crank web and crank pin portions projecting from said crank web integral therewith and each pin portion having a frusto-conical outer surface tapering at a small angle forward a free end face; tightly fitting tubular bodies of wear-resistant material on said crank pin portions, respectively, each having a tapering inner surface corresponding to said frusto-conical outer surface of the respective crank pin portion, and welding together said separate components at said end faces of corresponding ones of their crank pin portions to form a crankshaft having bearing contact surfaces formed by said wear-resistant material.

8. A method of manufacturing crankshafts comprising the steps of manufacturing a plurality of separate components each comprising a crank web and a pair of crank pin portions respectively projecting to opposite sides of said web integral therewith and each pin portion having a free end face, one of said crank pin portions having a length smaller than the other crank pin portion; tightly fitting a tubular body of wear-resistant material on each of said crank pin portions; facing the outer ends of said tubular bodies exactly flush with said end faces of said pin portions; and welding together the aligned crank pin portion of said components at the free end faces thereof to form a crankshaft having bearing contact surfaces formed by said wear-resistant material.

9. A method of manufacturing crankshafts comprising the steps of manufacturing a plurality of separate components each comprising a crank web and a pair of crank pin portions respectively projecting to opposite sides of said web integral therewith and each pin portion having a free end face, one of said crank pin portions having a length smaller than the other crank pin portion; tightly fitting a tubular body of wear-resistant material on each of said crank pin portions; aligning a crank pin portion of smaller length of one component with a crank pin portion of greater length on another component; and welding together the aligned crank pin portion of said components at the free end faces thereof to form a crankshaft having bearing contact surfaces formed by said wear-resistant material.

References Cited in the file of this patent

UNITED STATES PATENTS

| | | |
|---|---|---|
| 286,404 | Eddowes | Oct. 9, 1883 |
| 718,422 | Brophy | Jan. 13, 1903 |
| 1,581,982 | Pollock et al. | Apr. 20, 1926 |
| 1,715,489 | Baer | June 4, 1929 |
| 2,256,726 | Rippingille | Sept. 23, 1941 |
| 2,267,339 | Paulsen | Dec. 23, 1941 |
| 2,378,686 | Carstens | June 19, 1945 |
| 2,499,456 | Browne | Mar. 7, 1950 |
| 2,821,010 | Vasconi et al. | Jan. 28, 1958 |
| 2,848,800 | Maloney et al. | Aug. 26, 1958 |